Dec. 26, 1933.   A. KOSIK   1,941,094
METHOD OF SHAPING HOLLOW BODIES
Filed Nov. 28, 1930
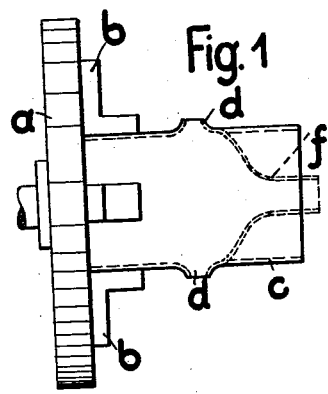
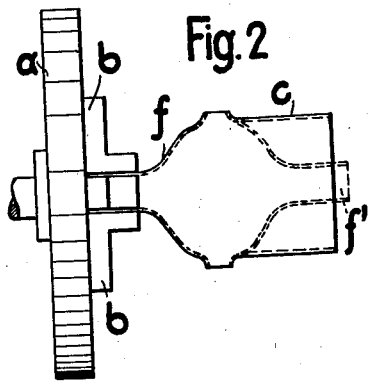
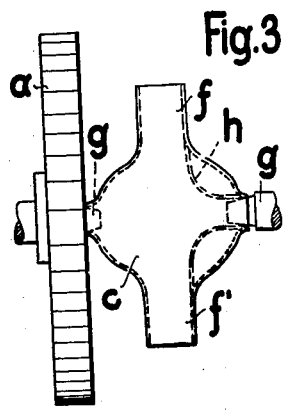
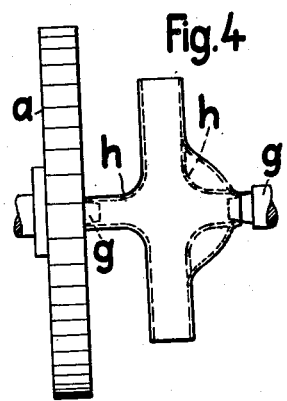
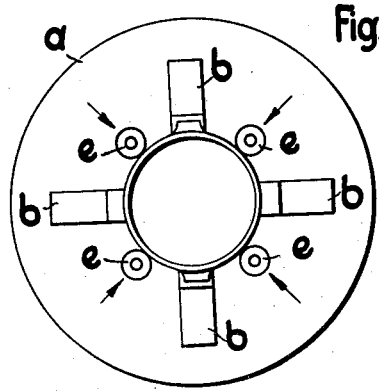
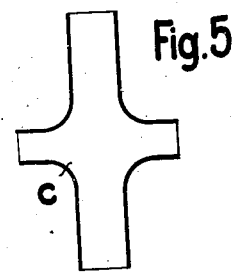
Inventor:
Adalbert Kosik Patented Dec. 26, 1933

1,941,094

UNITED STATES PATENT OFFICE 1,941,094

METHOD OF SHAPING HOLLOW BODIES

Adalbert Kosik, Beuthen, Germany

Application November 28, 1930, Serial No. 498,782, and in Germany October 16, 1930

2 Claims. (Cl. 29—157)

This invention relates to a method of shaping, from a tubular blank, a hollow body having a plurality of angularly disposed limbs, and the invention consists in forming the additional limbs by spinning the blank alternately about its longitudinal axis and about the axes of said additional limbs.

The spinning is preferably effected in known manner by means of a rotatable and axially movable head fitted with a plurality of radially adjustable rollers, the work being held by a rigid support for the operation of the rollers.

The invention is illustrated in the accompanying drawing in connection with the making of a cross pipe.

Figs. 1 to 4 are views showing the different stages of the reshaping process,

Fig. 1a is a front view of Fig. 1, and

Fig. 5 is a view of the finished article.

The blank, which in this case consists of a copper sleeve $c$, is clamped between the jaws $b$ of a chuck $a$ applied to the spindle of a lathe. Apertures $d$ are punched out from the sleeve where the cross piece is to be formed. While the blank is rotated by the chuck, radially and axially adjustable press rollers $e$ are applied to it, as shown in Fig. 1a, so as to upset the metal and reduce the end of the sleeve, as shown at $f$ in Fig. 1, to the dimension required in the cross pipe. Then the blank is reversed in the chuck, the reduced end $f$ being clamped between the jaws $b$, as shown in Fig. 2, whereupon the process is repeated, the opposite end of the sleeve being reduced to the shape shown at $f'$. After the second operation, the blank is clamped between mandrels $g$ applied to the apertures $d$, as shown in Fig. 3, and the outer part of the blank is reduced to form the part $h$ of the cross pipe. Then, after the blank has been reversed in the machine, as shown in Fig. 4, the opposite end is treated in the same manner to form the part $h'$.

The cross pipe is now practically finished but it can be after worked if desired in order to rectify the shape.

In this manner the cross pipe can be produced very much quicker than by hitherto known processes and it will be a great deal stronger since the walls are made thicker by the upsetting and since the pipe possesses no welding joints.

Instead of the cross pipe illustrated by way of example, other shapes can be produced in the same manner.

A sufficient number of press rollers must be employed to prevent the material from yielding in any but the desired inward direction. Thus the thinner the material under treatment the larger must be the number of press rollers employed. No specially constructed machine is required for the operation, the ordinary lathe fitted with chucks and face plate being quite suitable for the purpose.

The subject matter of the invention is not exhausted by the above description and by the illustrated examples, but covers all other embodiments within the principle of the invention.

I claim:

1. A method of shaping, from a tubular blank, a hollow metal body having a plurality of angularly disposed limbs, consisting in revolving the blank alternately about its longitudinal axis, and about the axes of said additional limbs, and compressing it while thus revolved by pressure applied simultaneously from different points in radial direction.

2. A method of shaping, from a tubular blank, a hollow metal body having a plurality of angularly disposed limbs, consisting in revolving the blank alternately about its longitudinal axis and about the axes of said additional limbs, and compressing it while thus revolved by means of radially adjustable press rollers.

ADALBERT KOSIK.